(12) United States Patent
Mittal et al.

(10) Patent No.: US 10,152,749 B2
(45) Date of Patent: Dec. 11, 2018

(54) SYSTEMS AND METHODS FOR TRADING A TRADE LIST IN FINANCIAL MARKETS

(71) Applicant: ITG SOFTWARE SOLUTIONS, INC., Culver City, CA (US)

(72) Inventors: Hitesh Mittal, Edison, NJ (US); Ronald Taur, New York, NY (US); Ryan Lee, New York, NY (US); Scott Kartinen, New York, NY (US)

(73) Assignee: ITG SOFTWARE SOLUTIONS, INC., Culver City, CA (US)

( * ) Notice: Subject to any disclaimer, the term of this patent is extended or adjusted under 35 U.S.C. 154(b) by 0 days.

(21) Appl. No.: 14/334,777

(22) Filed: Jul. 18, 2014

(65) Prior Publication Data

US 2015/0052037 A1 Feb. 19, 2015

Related U.S. Application Data

(63) Continuation of application No. 13/667,545, filed on Nov. 2, 2012, now Pat. No. 8,788,399, which is a continuation of application No. 13/330,017, filed on Dec. 19, 2011, now Pat. No. 8,306,906, which is a continuation of application No. 12/044,685, filed on Mar. 7, 2008, now Pat. No. 8,082,204.

(60) Provisional application No. 60/905,317, filed on Mar. 7, 2007.

(51) Int. Cl.
*G06Q 30/00* (2012.01)
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC ..................................................... G06Q 40/04
USPC ........ 705/35–37, 1.1, 36 R, 30, 26.1; 370/395
See application file for complete search history.

(56) References Cited

U.S. PATENT DOCUMENTS 5,101,353 A 3/1992 Lupien et al.
5,873,071 A 2/1999 Ferstenberg et al.
(Continued)

OTHER PUBLICATIONS

International Search Report and Written Opinion issued in PCT/US08/03036 dated May 22, 2008, 14 pages.
(Continued)

*Primary Examiner* — John H. Holly
(74) *Attorney, Agent, or Firm* — Prince Lobel Tye LLP

(57) ABSTRACT

Systems and methods are provided for maintaining neutrality while trading a list of securities using an algorithmic trading facility coupled with at least one destination. This destination includes at least one alternative trading system (ATS). This facility is coupled, via an electronic data network, to a plurality of trading clients, and configured to receive a trade request to trade a list of securities from a trading client. This request includes user defined trading constraints that are used to generate and transmit trade orders to at least one ATS. The orders are transmitted based on trading data related to the destinations, the trade list, and the trading constraints. The facility can identify each executed trade corresponding to the trade orders and calculate a trade imbalance. The facility can determine whether the trade imbalance exceeds the trading constraints, and reallocate one or more of said submitted orders based on this determination.

15 Claims, 5 Drawing Sheets

(56) References Cited

U.S. PATENT DOCUMENTS

| | | | |
|---|---|---|---|
| 7,487,125 B2* | 2/2009 | Littlewood | G06Q 40/04 705/37 |
| 2006/0253380 A1 | 11/2006 | Adcock et al. | |
| 2006/0265305 A1 | 11/2006 | Schluetter et al. | |
| 2007/0005485 A1* | 1/2007 | Tumen | G06Q 20/042 705/37 |
| 2007/0022029 A1 | 1/2007 | Ma et al. | |
| 2007/0027797 A1 | 2/2007 | Claus et al. | |

OTHER PUBLICATIONS

Soeren Hvidkjaer; "A Trade-Base Analysis of Momentum;" The review of Financial Studies; vol. 19 No. 2, 2006, pp. 457-491.
Bob Gabele Sell-Buy Ratio Reaches Highest Level in More than Year; Sun Sentinel; Fort Lauderdale, Jul. 24, 1995.
Elementary Algebral and Summation, wikipedia printed Oct. 12, 2010.
Nina Mehta "Building a Growing Desk"; New York: May 1, 2006.

* cited by examiner

SYSTEMS AND METHODS FOR TRADING A TRADE LIST IN FINANCIAL MARKETS

CROSS-REFERENCE TO RELATED APPLICATIONS

This application is a continuation of and claims priority to U.S. patent application Ser. No. 13/330,017, filed Dec. 19, 2011, which is a continuation of U.S. patent application Ser. No. 12/044,685, filed Mar. 7, 2008, now U.S. Pat. No. 8,082,204, issued Dec. 20, 2011, which is a non-provisional application of U.S. patent application Ser. No. 60/905,317, filed Mar. 7, 2007, the contents of each of which are incorporated herein in their entirety.

BACKGROUND OF THE INVENTION

Field of the Invention

The present invention relates generally to systems and methods for trading a trade list in non-displayed markets. In particular, the present invention relates to systems and methods for maintaining constraints, such as dollar or sector neutrality, when trading securities, found in a trade list or portfolio, in alternative trading systems.

Description of the Related Art

Generally, in the financial trading industry, there are two types of available destinations for execution of orders to trade securities: "displayed" and "non-displayed." At a displayed destination, information relating to BUY orders (bids) and to SELL orders (offers) is made available to interested parties. By contrast, BUY and SELL orders sent to non-displayed destinations are not made available to the public, and are instead kept hidden. The lack of disclosure found in non-displayed trading forums provides both benefits and drawbacks, as further discussed below.

The NYSE, NASDAQ, and ECNs are examples of displayed destinations, also called the "open markets." These destinations publish, by subscription or otherwise, data related to BUY and SELL orders, e.g., "level 2" data available at each trading destination. This published data can be electronically transmitted to subscribers, and be displayed using a graphical user interface in combination with a display device, such as a desktop computer.

Non-displayed destinations are generally known as alternative trading systems or ATSs. Because BUY and SELL order information in ATSs is kept hidden, these trading forums are attractive destinations for traders who desire minimal information leakage about their orders. By minimizing the information leakage, market impact can be minimized, at least, or avoided, at best. Institutional traders often trade large quantities of shares, commonly called "blocks", and information leakage can result in price movement that may have a dramatic affect on the trader's overall return.

For example, if a trader submitted a BUY order for 100,000 shares of IBM to a displayed destination, information about this BUY order would be available to everyone subscribing to the corresponding market data. Sellers armed with knowledge of the submitted BUY order would be aware of the high demand for IBM and will submit SELL orders for IBM at an increased price. As a result, upward pressure is placed on the IBM stock price. Conversely, if the same BUY order had been submitted at an ATS, the order information would have been hidden, and any risk of upward pressure resulting from the BUY order information would have been alleviated.

ATSs generally differ from displayed markets with respect to trade execution price. In particular, unlike displayed destinations, when a match occurs at an ATS between BUY and SELL orders for the same security, the ATS typically sets an execution price for that match that is derived from current prices displayed in the open markets. In some ATSs, such as ITG's POSIT, the execution price for a match is the midpoint price of the displayed market bid and ask.

Unfortunately, ATSs suffer from some disadvantages because of their hidden or "dark" nature. One disadvantage is that the liquidity available at ATSs is typically smaller than the liquidity available at displayed destinations. However, as described above, the non-displayed liquidity of ATSs is valuable to institutional investors due to the reduced risk of information leakage.

Compounding the smaller liquidity, is the fact that traders cannot see the BUY and SELL orders available in the ATSs. As a result, there is no guarantee of a trader completely or partially filling a BUY or SELL order submitted to an ATS. Thus, the risk of no execution or partial executions always exists when trading in ATSs.

ATSs have the disadvantage that their liquidity is not continuous. That is, the liquidity found at an ATS during one trading period is not necessarily found during any other trading period. Further, the liquidity that exists at an ATS is not necessarily consistent even throughout the trading time period. Moreover, liquidity between ATSs varies, and while one ATS might have high liquidity for a particular stock, a different ATS might simultaneously have low liquidity for the same stock.

Some ATSs have minimum size requirements that restrict when an order can be submitted to the ATS. The bigger the minimum size limitation, the larger the dollar commitment to that ATS becomes. Thus, a trader that wants to trade at a particular ATS that has a high minimum size requirement may be forced to concentrate their trade orders at that one ATS, rather than a variety of ATSs having smaller minimum size requirements or no size requirements.

It is not possible for a trader to force the execution of an order at an ATS if the liquidity is simply not present. Trying to force an execution (by crossing the bid-ask spread) is a capability in the open markets that causes information leakage.

Many investment managers maintain portfolios that are both long and short (i.e., different securities are bought and sold in the same portfolio). The purpose of such a strategy is to hedge market risk and capture relative stock specific returns. In order to keep these types of portfolios fairly risk neutral, it is important to trade them at a specified rate, consistent with the overall composition of the portfolio. Typically, this rate is 1:1, which means SELLs and BUYs should be executing at the same rate dollar wise (i.e., "dollar neutrality"). When SELLs and BUYs execute at the same rate, the trading is dollar neutral. However, there may be times when a trader desires a different rate of execution.

Dollar neutrality during trading is also important to managers of portfolios that contain only long positions (i.e., long-only portfolios). When long-only portfolios are rebalanced, the resulting trade lists are typically a mixture of BUY and SELL trades, containing stocks the trader wishes to increase and decrease positions in. Maintaining dollar neutrality throughout the duration of trading helps reduce a portfolio or trade list's exposure to stock price volatility. As prices generally rise, unfilled BUY orders will become more expensive to execute, while unfilled SELL orders will be more valuable. Thus, value lost on one side of the trade list is hedged by the change in value of the list's other side.

Dollar neutrality is difficult to achieve when trading in ATSs for at least the above-described reasons. One way to control dollar neutrality, and other properties of a trade list, while trading in one or more ATSs is to submit a limited number of small orders to the various ATSs. The orders can be sized in such a way that when filled, the list's properties, for example dollar neutrality, are maintained. However, this technique limits the exposure of the trader's orders to the hidden liquidity available at the ATSs. Therefore, this technique is undesirable because it forces a trader to sacrifice possible executions in order to maintain a trade list's neutral characteristics.

Similar to dollar neutrality is the concept of "sector neutrality." In the case of sector neutrality, a trader desires to maintain dollar neutrality, as described above, on a sector level. In other words, if the list is broken down into many sub-lists—one list for each sector—then sector neutrality is equivalent to applying dollar neutrality at the sub-list level. Sectors maybe broken down by industry, for example agricultural or automotive.

For displayed destinations, i.e., open markets, algorithms exist for taking a long-short portfolio, and ensuring that the execution rate between the BUYs and SELLs are within a specified tolerance. This is easy because the markets are displayed. If one side, either BUY or SELL, of the portfolio happens to be over executing, algorithms can adjust the rate of execution by canceling out trades on the side that is over executing. Furthermore, these algorithms have the ability to cross the bid-ask spread for the side that is executing too slowly, virtually ensuring an execution for that side.

Additionally, in a displayed destination, a trader may utilize market orders that will continually consume liquidity until the client order is filled. This is possible because, in a displayed destination, current market pricing and liquidity is visible. However, when trading at ATSs, it may be difficult to determine if a counter party exists for a trade, and because the liquidity at an ATS remains hidden there can be no guarantee of an execution. Furthermore, most ATSs will automatically cross at the midpoint, thus there is no incentive for any trader to improve their order price to attract further liquidity.

In view of the foregoing, there is a need for new and improved systems and methods for trading trade lists or portfolios within ATSs while maintaining dollar neutrality and/or sector neutrality.

SUMMARY OF THE INVENTION

According to various embodiments of the present invention, a method for trading a list of securities is provided. This method includes a step of receiving a request to trade a list of securities is received. This request may include user defined trading constraints. Trade orders may be submitted to destinations including at least one alternative trading system (ATS). These order submissions may be based on trading data related to the destinations, the trade list, and the trading constraints. Each executed trade from the trade orders is identified. A trade imbalance is calculated. The trade imbalance may be based on the identified executed trades and the trade list. It is determined if the trade imbalance exceeds the trading constraints. One or more of the submitted orders may be reallocated based on the determining step.

According to various embodiments of the present invention, a system for trading a list of securities is provided. The system includes an algorithmic trading facility coupled with at least one destination. This destination includes at least one alternative trading system (ATS). Further, the algorithmic trading facility is coupled, via an electronic data network, to a plurality of trading clients. The algorithmic trading facility is configured to receive a trade request to trade a list of securities from a trading client. This request includes user defined trading constraints that are used to generate and transmit trade orders to at least one ATS. The transmitting of trade orders is based on trading data related to the destinations, the trade list, and the trading constraints. Further, the algorithmic trading facility can identify each executed trade corresponding to the trade orders and calculate a trade imbalance. The trade imbalance is based on the identified executed trades and the trade list. Further, the algorithmic trading facility can determine whether the trade imbalance exceeds the trading constraints, and reallocate one or more of said submitted orders based on this determination.

According to various embodiments of the present invention, a computer-readable storage medium having computer executable program code stored therein for trading a list of securities is provided. This computer-readable storage medium may contain the following coded operations. An operation for receiving a request to trade a list of securities. This request may include user defined trading constraints. An operation for submitting trade orders to destinations including at least one alternative trading system (ATS). These order submissions may be based on trading data related to the destinations, the trade list, and the trading constraints. An operation for identifying each executed trade from the trade orders. An operation for calculating a trade imbalance. The trade imbalance may be based on the identified executed trades and the trade list. An operation for determining if the trade imbalance exceeds the trading constraints. An operation for reallocating one or more of the submitted orders based on the determining operation.

According to various embodiments of the present invention, systems and methods are provided that can virtually ensure that a trade list meets constraints, see example dollar and/or sector neutrality, when simultaneously trading in at least one of non-displayed trade forums, such as an ATS. A plurality of trade orders can be generated and submitted to a plurality of ATSs simultaneously while accurately estimating stock liquidity using historical and real-time sampled trade data for each stock at each ATS. Controls can be provided to monitor each execution for the trade orders placed in the ATSs, and to rebalance the trade lists to meet trade constraints.

According to various embodiments of the present invention, systems and methods are provided for trading in at least one ATS while maintaining dollar and/or sector neutrality. Using historical data, the amount of liquidity available in at least one ATS is estimated for each security in a trade list. Based on expected liquidity, trade orders are generated and submitted to one or more ATSs. Other trading characteristics that a trader might want to maintain include sector weights, country/region weights, liquidity, and/or forecast risk (estimated by a risk model) in the filled or unfilled shares.

According to other embodiments of the present invention, trade orders are further generated based on capital imbalance (i.e., dollar neutrality) for a trade list.

According to other embodiments of the present invention, trade orders are further generated based on capital imbalance for equities in a same sector (i.e., sector neutrality) within a trade list.

Further applications and advantages of various embodiments of the present invention are discussed below with reference to the drawing figures.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to any specific preferred embodiments described and/or illustrated herein. The following description of embodiments of the present invention utilize the defined terms and variables found below.

"Hit rate," or "hit rate probability," is the probability that any liquidity (even an amount that will result in a partial execution) will be present at a particular ATS. The hit rate for a security can be measured from historical and/or real-time market data for an ATS, and indicates the probability that any liquidity will be present. The hit rate of a security or type of security has been found to increase when a fill in the security has recently occurred. Accordingly, real-time analytics can be used to determine if a complete or partial fill for a particular stock occurred in a time period, e.g., the past T minutes, where T is a number that is either set or user defined. A conditional hit rate can be used with or as an alternative to the hit rate probability.

"Conditional hit rate" can be represented as equation:

conditional hit rate for stock $i$ in ATS $j$=Probability of an execution of stock $i$ in ATS $j$|an execution in stock $i$ in ATS $j$ just occurred.

A "trade imbalance" is the total value of SELL executions (including shorts) minus the product of a SELL-to-BUY Ratio and the total value of BUY executions, as shown as an equation:

$$\text{Trade Imbalance} = \sum_{i \in Sells} \text{ExecutedValue}_i - \left( \text{SELL:BUY\_Ratio} * \sum_{j \in Buys} \text{ExecutedValue}_j \right).$$

An "expected fill imbalance" is a predicted trade imbalance based on the composition of the trade list and on corresponding historical data. The expected fill imbalance can be used for a number of purposes including generation of an initial set of orders and for the construction of trade lists predisposed to dollar neutrality. To determine the expected imbalance, it is first necessary to find the expected fill value for a stock. The expected fill value for a stock is the hit rate probability times the average trade size for that stock times the stock price. The expected fill value for a stock may be represented by the equation:

Expected Fill Value for stock $i$=Hit Rate for stock $i$*Avg Trade Size*Price of Stock $i$.

The expected trade imbalance for a trade list is the sum of all the SELL's expected fill sizes minus the product of the SELL-to-BUY Ratio and all the BUY's Expected fill sizes, as shown in the equation:

$$\text{Expected Trade Imbalance} = \sum_{i \in Sells} \text{ExecutedFillValue}_i - \left( \text{SELL:BUY\_Ratio} * \sum_{j \in Buys} (\text{ExecutedFillValue})_j \right).$$

Figure 1:
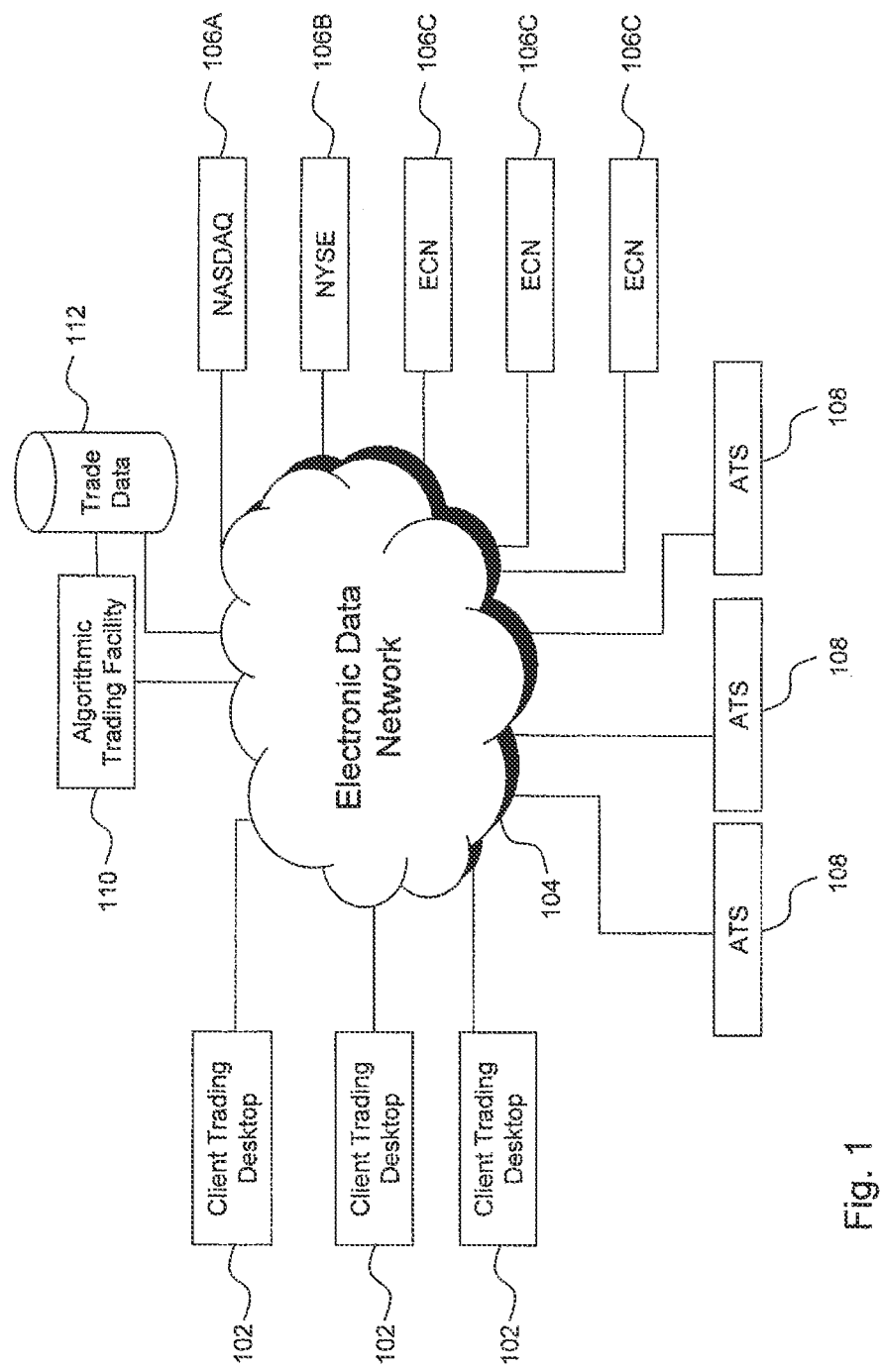
FIG. 1 is a block diagram of an exemplary system for trading a trade list according to an embodiment of the present invention.

FIG. 1 is a block diagram illustrating salient features of a system for trading a trade list according to an embodiment of the present invention. The system may include one or more client trading desktops 102 that may be electronically coupled with an electronic data network 104. Also coupled with the network are a plurality of trading forums including, but not limited to, displayed destinations such as the NASDAQ 106A, NYSE 106B, and ECNs 106C, and non-displayed destinations, such as a plurality of ATSs 108. ITG Inc., the assignee of the present invention, owns and operates several ATSs including POSIT, POSIT Match, and POSIT Now.

Each client 102 may be configured to transmit trade orders directly to the destinations via the network using a FIX connection or the like. Accordingly, each client 102 may include order management system (OMS) or execution management system (EMS) facilities for creating, updating, cancelling, transmitting, and tracking trade lists, portfolios and/or orders. Commercially available OMSs and EMSs are known; for example, ITG Inc., the assignee of the present invention, offers several EMS and OMS solutions (see, www.itg.com). A trade list may include, but is not limited to, information such as: stock symbol or name, side of transaction (e.g., BUY or SELL), and number of shares to be traded.

An algorithmic trading facility 110 may be provided that is also coupled with the network, and that may be configured to receive a trade request (typically comprising a trade list along with user specified trade constraints) from a client 102 and to effect that trade request by generating and transmitting a plurality of trade orders to at least one ATS. As is described in more detail below, the algorithmic trading facility is also configured to dynamically monitor and reallocate the trade orders in order to satisfy trader submitted constraints, e.g., the algorithmic trading facility 110 is configured to add, cancel, modify and move trade orders in order to maintain a ratio of executed BUY orders and SELL orders equal to a trader selected ratio (e.g., neutral=1).

User specified tolerances may also be included in the trader's constraints. For example, a trader could submit a trade list, constraints requiring that the trade list be executed a certain way (e.g., dollar neutral (i.e., SELL Value/BUY Value=1)), and constraints specifying the degree or range (i.e., a tolerance) that the resulting trades can deviate from the specified ratio (i.e., 1). Moreover, the tolerance constraints can be different for BUY orders than for SELL orders. Further, a trader may set the desired dollar, sector, country, region, currency, and/or risk targets to be followed during trade list execution. Additionally, the tolerance may be specified as a trade imbalance, in which case, the trade imbalance result is compared to a trader's tolerance preferences when determining whether trade constraints have been met within the specified range. According to a preferred embodiment, the trader specifies the upper and lower bounds as a BUY minus SELL tolerance and a SELL minus BUY tolerance, respectively.

In order to achieve a trade list execution that meets user specified trade constraints in ATSs, the system may continually monitor and assess execution data for the BUY and SELL trade orders submitted to the plurality of ATSs for deviation from acceptable tolerances. For example, the algorithmic trading facility 110 can be configured to receive market or trade data (i.e., historical and real-time) from trade data facilities, such as, but not limited to, subscriber data feeds, trade messages, etc., and to calculate the trade imbalance of the executions and compare the calculated trade imbalance to trade constraints. If there is one side (BUY or SELL) that is over executed with total value of executions, then orders on that side can be reallocated (e.g., cancelled or modified) until the under executed side may catch up.

According to a preferred embodiment of the present invention, the system is configured to cancel trade orders on an over executing side (e.g., BUY or SELL) in the event that the user specified tolerance for the trade constraints is close to being violated. The algorithmic trading facility can be configured to monitor executions on a timed basis, for example, every 10 seconds, to determine whether the current trade imbalance of the trade list exceeds the trader specified tolerance. As stated above, the tolerance can be specified as a range, and the upper and lower bounds can be different.

When the imbalance is within Y %, for example 90%, of either tolerance, a mode is entered known as risk trading. During risk trading, orders are canceled out on the side of the portfolio that is over executing relative to the trader's preferences. This allows the lagging trade side to catch up, and for the trade list to regain and maintain neutrality. The systems and methods exit risk trading and enter normal trading mode when dollar neutrality is within Z %, for example 50% of the tolerance. In a preferred implementation, 0<Z<Y.

The present invention is not simply reactive—only correcting for dollar neutrality after the acceptable tolerances have been violated—rather, the present invention can proactively prevent trade constraints from being violated while trading in non-displayed trade destinations. In order to be proactive, both historical and real-time data can be utilized to estimate and predict the execution of trades that may impact the trade list. With this market information, trade orders can be generated and transmitted in such a way that the estimated and predicted rate of trades will meet the user specified trade constraints (e.g., dollar and/or sector neutrality).

The estimation of "hit rates" and average trade sizes per stock per ATS can be utilized to generate and/or optimize a trade list or portfolio trade in at least one ATS that complies with user specified trade constraints. By using historical sampled data, from sources such as ITG Inc., the average trade size can be estimated for each security name in each ATS. The average trade size of a stock in an ATS impacts the liquidity of that stock in that ATS. Furthermore, it is possible to estimate from historical data the probability that any liquidity (even an amount that will result in a partial execution) will be present when trading a particular security or type of security at a particular ATS, i.e., hit rate.

As stated above, the hit rate of a security or type of security has been determined to increase when a fill in the stock has recently occurred. Accordingly, the algorithmic trading facility can be configured to perform real-time analytics to determine if a fill, complete or partial, for a particular stock occurred in a time period, e.g., the past T minutes, where T is a number that is either set or user defined. The conditional hit rate can be used with or as an alternative to the hit rate described above.

In order to determine when tolerance levels have been, or may be, compromised, preferably, a minimum of three user inputs are utilized: a BUY minus SELL tolerance, a SELL minus BUY tolerance, and a SELL-to-BUY ratio. For example, if a trader specifies symmetric trading as trading constrains, the two tolerances would be equal, and the SELL-to-BUY ratio would be 1:1. Additionally, the SELL-to-BUY ratio can be set as cash neutral, meaning that the SELL-to-BUY ratio would be 1, ratio neutral, meaning that the SELL-to-BUY ratio would be equal to the total value of SELL orders/the total value of BUY orders on the trade list; or the SELL-to-BUY ratio can be user defined as any number greater than zero.

According to another aspect of the present invention, as the trade list is executed, the system may adjust user specified tolerances in an effort to balance out future executions even if the past executions have moved the trade list toward violating the specified tolerances. The present invention can be configured to take into account the current state of the trade list by assessing the current BUY and SELL executions. Equations representing the self adjusting logic are found below:

New SELL Minus BUY Tolerance=Client SELL Minus BUY Tolerance−(SELL Execution Values−(SELL-to-BUY Ratio*BUY Execution Values);

New BUY Minus SELL Tolerance=Client BUY Minus SELL Tolerance+(SELL Execution Values−(SELL-to-BUY Ratio*BUY Execution Values);

Target Expected Imbalance=(−1*New SELL Minus BUY Tolerance)+(New SELL Minus BUY Tolerance+New BUY Minus SELL Tolerance)/2.

According to an embodiment of the present invention, historical and real-time market data can be weighted appropriately to provide accurate results. Real-time data is preferably used to sample for current day hit rates and liquidity estimation. However, real-time data for a particular trading time period is not available from the outset of the trading time period. Thus, the majority of the data at the outset of the trading time period is generated from historical sources. As the trading time period progresses, an ever increasing real-time data set is generated for the trading time period. As a result, the historical data that was a majority of the data used is no longer as necessary, and it is more importantly less accurate than the collected real-time data.

The present invention can adapt dynamically to the current environment by using a mixture of weighted historical and real-time data. The weights given for real-time hit rates and historical hit rates are determined by the amount of the trading time period that has elapsed. Thus, at the beginning of a trading period, historical data is weighted heavily, and as the trading period progresses the real-time data from the current day is increasingly weighted versus the historical data. This weight shift helps to provide accurate hit rates and liquidity estimation. Below are equations that illustrate the weighting principle of the auto-learning aspect of the current invention.

Hit rate for stock i in ATS j=historical hit rate for stock i in ATS j*(1−(minutes past 9:30 am/390))+(minutes past 9:30 am/390)*today's Hit Rate;

Avg Trade Size for stock i in ATS j=Average Avg Trade Size for stock i in ATS j*(1−(minutes past 9:30 am/390))+(timeMin/390)*today's avg trade size.

Additionally, after the system reaches a threshold number of executions for a stock at an ATS, the hit rate and average trade size for stock i in ATS j is derived fully from real-time data. The following logic illustrates this principle.

Sufficient Number of Reports for ATS j=a configurable parameter
If (Number of Reports for stock i in ATS j>=Sufficient Number of Reports for ATS j)
{hit rate for stock i in ATS j=today's hit rate for stock i in ATS j Average trade size for stock i in ATS j=today's average trade size for stock i in ATS j}.

According to another aspect of the present invention, trade orders can be reallocated across ATSs in order to maximize the rate of trade execution and/or prevent the violation of the two user defined bounds, the BUY minus SELL tolerance and SELL minus BUY tolerance. This reallocation can come in the form of cancellations, corrections, new orders, or the use of reserve shares, i.e., shares not already sent to an ATS. For example, the algorithmic trading facility can be configured to monitor execution data from all of the ATSs in which a trade order has been submitted. If an order is not executing in a particular ATS, the order can be reallocated to another ATS where additional liquidity exists. For example, if a complete execution occurs in one ATS, orders in other ATSs can be cancelled and new orders can be submitted to the ATS where the execution occurred. Naturally, this reallocation is dependant on the execution of the reallocated order not violating the user defined tolerances.

For example, a BUY order for 100,000 shares of IBM is placed in ATS X, but is not executing over a period of time. As SELL orders of the trade list execute, the trade list is over-executing to the SELL side. When a BUY order for 5,000 shares of IBM executes immediately on ATS Y, the system can reallocate some or all of the BUY order for 100,000 shares of IBM from ATS X to ATS Y in an effort to execute the order and maintain neutrality.

Figure 2:
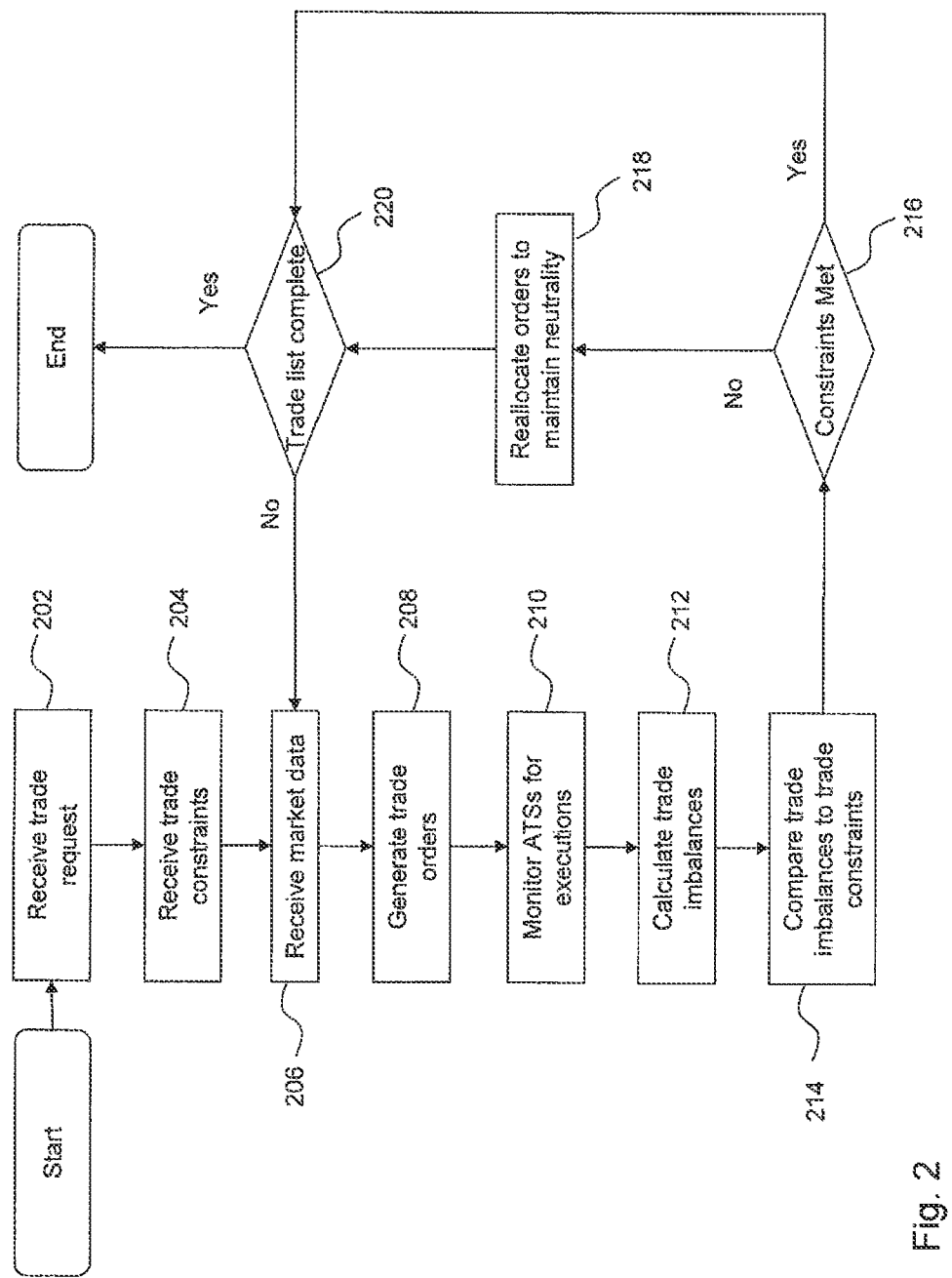
FIG. 2 is a flow chart of an exemplary method for trading a trade list according to an embodiment of the present invention.

FIG. 2 is a flow chart of an exemplary process for trading a trade list according to an embodiment of the present invention. At step 202, a trade request is received. For example, as described above with respect to FIG. 1, a trading client can generate and transmit to the algorithmic trading facilities a trade list or portfolio trade.

Next at step 204, trade constraints are received. As already described above, the trade list can be submitted along with trade constraints, the trade constraints can be submitted separately to the algorithmic trading facilities, or the trade constraints can be set as predefined defaults. Corrected trade constraints are sent separate from the trade list. Trade constraints preferably include a neutrality constraint that defines a ratio of BUYs to SELLs for a particular category, e.g., dollar neutrality, sector neutrality, etc. In such circumstances, the SELL-to-BUY ratio is typically 1; however, the trader may specify any ratio desired. The trade can further include a BUY minus SELL tolerance and/or a SELL minus BUY tolerance that define an acceptable range or amount of deviation from the neutrality constraint. For example, it may be mathematically impossible or unlikely for an executed trade list to result in a ratio of SELL-to-BUY to be exactly one, but the trader may still desire for the trades to be effected even if the neutrality constraint of one cannot be exactly met. Therefore, the trader can include the tolerances to allow for a defined amount of deviation from the neutrality constraint.

Figure 5:
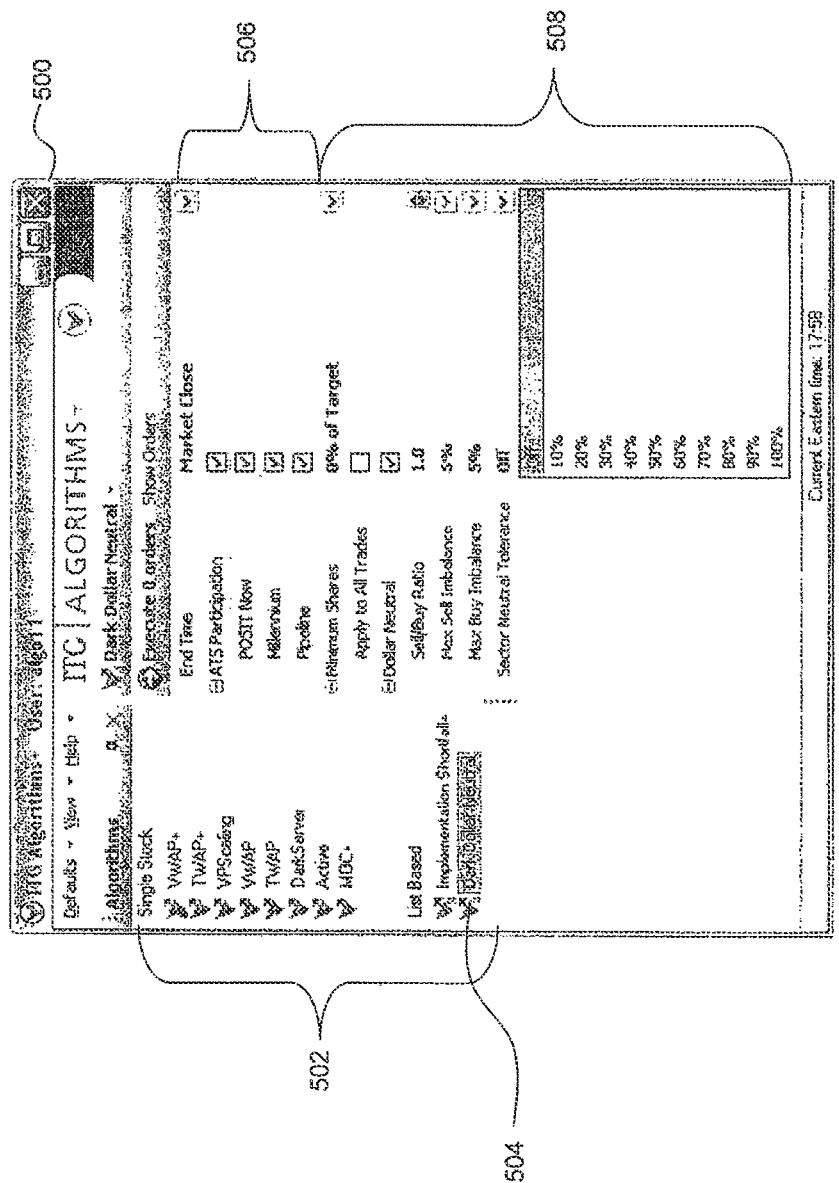
FIG. 5 is a screen shot of a graphical user interface according to an embodiment of the present invention.

An exemplary user interface for submitting constraints according to an embodiment of the present invention is shown in FIG. 5 and is described further below.

At step 206, market data is received which may include data from real-time feeds and historical market data. The market data can be used for both initial generation of trade orders as well as the dynamic updating of the existing orders in response to real-time market activity.

At step 208, a plurality of trade orders are generated and transmitted to a plurality of ATSs based on at least historical market data and/or real-time market data, the trade request received, and the trade constraints received. For example, as described above, the sizes, side, and destination of each trade order can be determined based on historical execution data for each ATS for each security. Accordingly, a first set of trade orders can be submitted to at least one ATS in order to effect the trade request according to the trade constraints that were received.

Next at step 210, each ATS being traded at is monitored for trade execution. As already described above, ATSs are "dark" pools and do not publish bids and offers, however, as executions occur, information about executions returns to the submitting entity (for instance, the algorithmic trading facility). The executions bear insight into market conditions for each ATS, and can identify hidden liquidity. Further, as the outstanding trade orders for a particular trade list execute or partially execute, this execution data can be used to dynamically update the outstanding trade orders in order to meet the trade constraints associated with the trade list.

Next at step 212, trade imbalances are calculated. As already described above, the actual trade imbalance for the trade list is calculated based on real-time market activity including executions relating to the outstanding trade orders for the trade list. Further, expected trade imbalances are also calculated as described above.

At step 214, the trade imbalances are compared against the trade constraints. For example, as already described above, the current trade imbalance is compared to the user specified neutrality constraint and tolerances to determine whether outstanding trade orders need to be canceled or modified, or if new trade orders need to be generated.

If at step 216, if it is determined that the trade constraints are not met, then at step 218 it is determined whether, and how, to reallocate orders, i.e., cancel, update, or to submit new trade orders. For example, as described above, the value of the list becomes higher than the other side, and trade orders for the side that is higher can be canceled to insure that that side does not further increase and prevents the trade list from further exceeding constraint.

At step 220, it is checked whether the trade request is completely filled (i.e., all trades are complete and constraints are met). If the trade request is not complete, then processing returns to step 206. Likewise, at step 216 if constraints were met, it is checked whether the trade request is complete as well. Of course, if the trade request is complete, the processing ends.

In another embodiment of the systems and methods of the present invention, trade imbalances are calculated using the SELL and BUY orders that have not yet been executed. Thus, the equation representing the trade imbalance and expected trade imbalance would be as shown below respectively:

$$\text{Trade Imbalance} = \sum_{i \in Sells} \text{UnsexecutedValue} -$$

$$\text{Expected Trade Imbalance} = \sum_{i \in Sells} \text{ExecutedLeaveValue}_i - \left( \text{SELL:BUY\_Ratio} * \sum_{j \in Buys} \text{UnexecutedValue}_j \right),$$

$$- \left( \text{SELL:BUY\_Ratio} * \sum_{j \in Buys} (\text{ExecutedLeaveValue})_j \right).$$

By using these equations, the systems and methods of the present invention maintain the neutrality of a trade list after neutrality has been initially achieved. Further, the systems and methods of the present invention may switch from using the executed values to using the unexecuted values if neutrality is achieved in a trade list that was initially not neutral.

Figure 3:
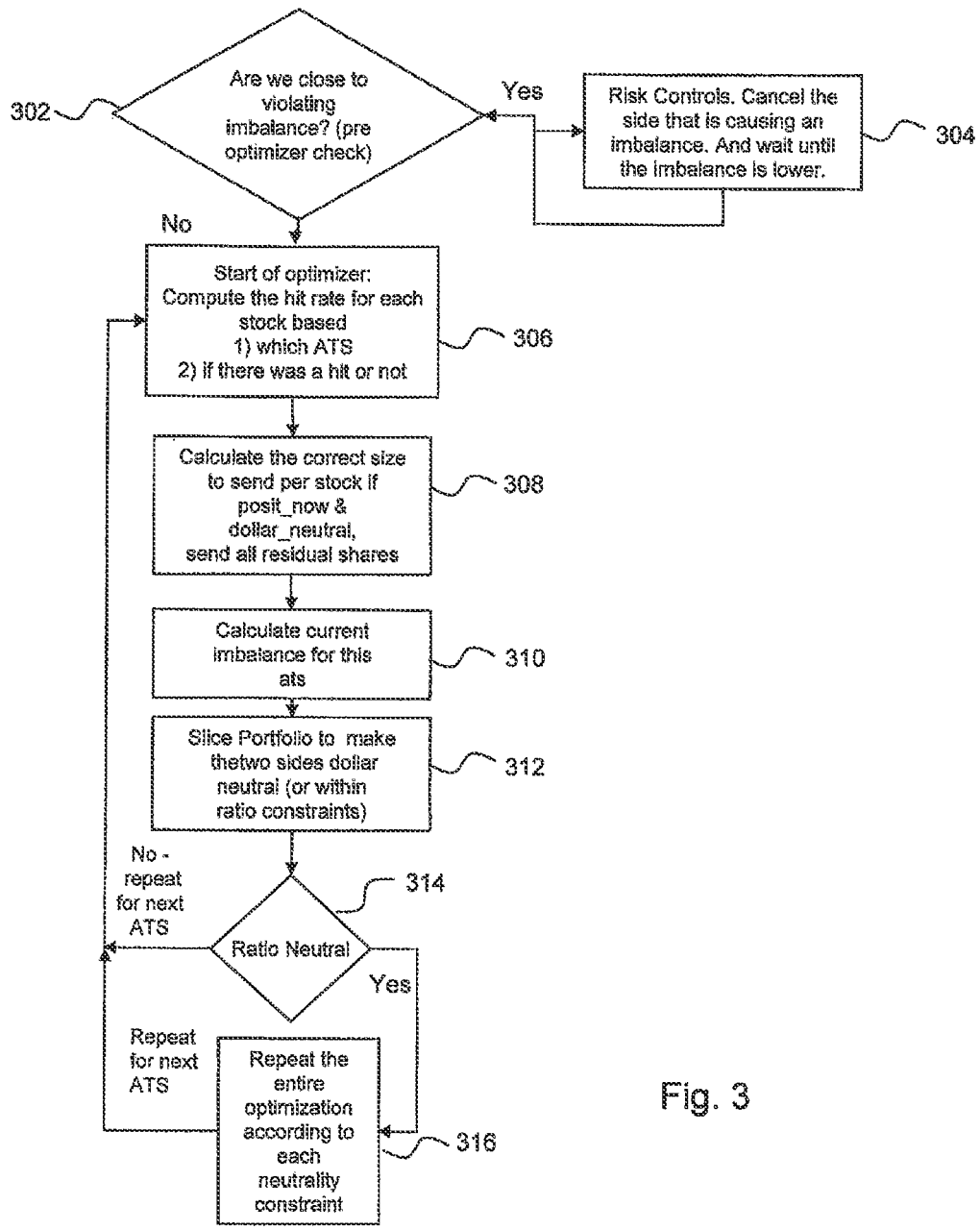
FIG. 3 is a flow chart of an exemplary method for optimizing a trade list according to another embodiment of the present invention.

FIG. 3 is a flow diagram of a method for dynamically optimizing a currently executing trade list according to an embodiment of the current invention. For a given trade list being traded, it is first determined at step 302 whether the executions are close to violating user defined constraints. If the answer is yes, then placed orders can be cancelled, as described above. If the answer is no, then processing continues to step 306 for optimization.

At step 306, the hit rate for each security in the trade list is calculated for each ATS. Next, at step 308, it calculates the correct size of each security to be sent to an ATS. If the trade list is currently dollar neutral, and an ATS appears to have the liquidity available to fill the remaining shares of a particular security, all residual shares of that security can be transmitted to that ATS.

Assignee of the present invention owns and operates a matching system (i.e., crossing destination) called POSIT (see U.S. Pat. No. 5,873,071 filed on May 15, 1997, which is hereby incorporated by reference). ITG Inc. also owns and operates POSIT Match, which provides scheduled matches with concentrated liquidity throughout the trading day and in our unique after-hours cross; crosses orders at the midpoint of the bid-offer spread, resulting in significant price improvement of executions; and ensures total anonymity so that trading results in no market impact. ITG Inc. also owns and operations POSIT Now, which offers continuous intraday crossing and total anonymity; and ensures no missed trading opportunities once orders have been submitted. POSIT Match and POSIT Now have the capability of implementing complex constraints while executing a portfolio. According to an aspect of the present invention, residual shares in the trade list can all be sent to POSIT Match or POSIT Now along appropriate constraints at any point in the trading day in order to complete the trade list.

Next, at step 310, the current imbalance for each ATS is calculated (as noted above, the trade imbalance may be calculated using the unexecuted values of the trade list). At step 312, the portfolio can be sliced to make two slices that are dollar neutral (or within ratio constraints).

At step 314, it is determined whether the trade list is ratio neutral. If yes, then at step 316 the entire optimization routine is performed for a subset of the data, for each neutrality constraint, such as dollar, sector, country, etc. For example, if the neutrality constraint is "sector neutral," then optimization is run for each sector. If no, then processing returns to step 306.

Figure 4:
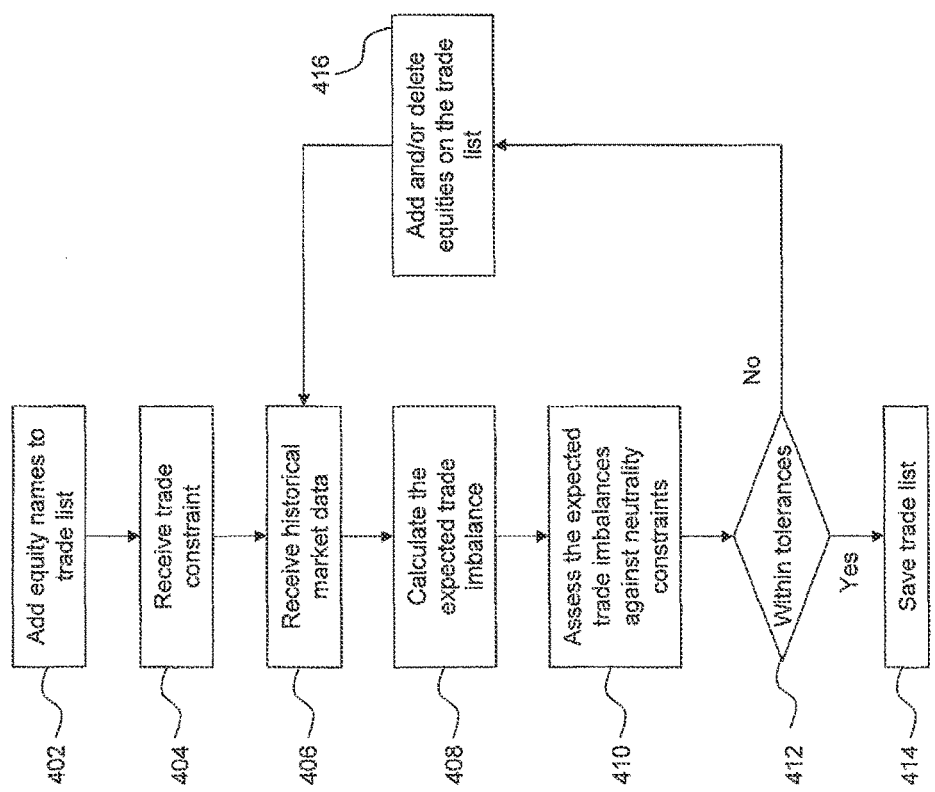
FIG. 4 is a flow chart of an exemplary method for creating a trade list according to an embodiment of the present invention.

FIG. 4 is a flow diagram of an exemplary method for the construction of a trade list that is predisposed to dollar neutrality, according to an embodiment of the present invention. At step 402, a trader adds equity names to a trade list. The equities in a trade list are typically part of a larger portfolio. For example, a trader may use an OMS or EMS tool to begin construction of the trade list, however a separate portfolio management tool might be used as well.

Once the first trade list has been assembled, at step 404 the trader enters neutrality constraints into the system. These neutrality constraints include, but are not necessarily limited to, BUY minus SELL tolerance, SELL minus BUY tolerance, and a SELL-to-BUY ratio.

At step 406, historical market data is received and at step 408, an expected trade imbalance is calculated, as described above, from the historical market data. Once the expected trade imbalance has been calculated, it is compared to the user defined neutrality constraints at step 410. At step 412, it is determined whether the expected trade imbalance is within the specified tolerances. If so, the trade list is saved at step 414 and can be executed by the trader. If however, the expected trade imbalance violates the specified constraints, the trader can change the makeup of the trade list at step 416, and the process is repeated until a suitable trade list is saved.

FIG. 5 is a screen shot of an exemplary interface for trading a trade list according to an embodiment of the present invention.

Screen 500 includes a number of selections 502 for executing algorithms for single name trades and for list based trades. Dollar neutrality 504 is a selection for implementing a list based trade wherein the resulting executions are dollar neutral (i.e., SELL-to-BUY ratio=1). A dollar neutral block is provided that includes a number of check boxes 506 for selecting the ATSs for participation, and a combination of fields 508 for specifying trade constraints for the trade list. For example, fields can be included for specifying the SELL/BUY ratio, max SELL imbalance and max BUY imbalance (in this example, as a percentage), and sector neutrality constraints.

An interface such as that shown in screen 500 may be provided on a trading client, and provides a means by which a trade request can be provided by the trader. Not show, the trade list can be specified conventionally and attached to the constraints.

Additionally, several ATSs publish information about indications of interest (i.e., an IOI). An IOI is not a firm order, but rather an indication that a trader is interested in making a trade. IOIs generally include the name of the security, and also may include the side and amount of the potential trade. These ATSs may require a minimum share amount to participate in the IOI matching process. The above described systems and methods may be used in conjunction with IOI capable ATSs. The present invention may be configured to reacting to an IOI. In this case, the share amount submitted for the security should not exceed the trade constraints. If this share amount is under the minimum share amount, as specified by the ATS, then no shares will be sent.

Additionally, several electronic communication networks (i.e., ECNs) allow a "hidden" order type. Along with displayed liquidity, there is also non-displayed liquidity that may reside on the ECN. The present invention will send hidden orders to these destinations at a price of midpoint or better. These hidden orders are not displayed, and thus there is no information leakage. The allocation and subsequent reallocation of these hidden orders will involve hit rates, average trade sizes, and processing information from the displayed liquidity on that ECN (i.e., "level 2" data).

Some ATSs will indicate out interest without first having committed shares being sent. The present invention will utilize sending out IOIs to maximize trade executions. Furthermore, any committed shares executed during the matching process will not exceed the list tolerances.

As briefly mentioned above, according to an embodiment of the present invention, a trade lists can be constructed to meet a target expected imbalance level. Thus, when a trader desires to achieve a particular imbalance with trade list, one can be constructed so that, on average, executions occurring in the future will satisfy the trader's preferences. In the event that one side of the trade list executes beyond tolerance levels, a set of controls can applied.

However, the systems and methods of the present invention do not require that the trade list be constructed to be dollar neutral. More importantly, even in situations where no predisposition to dollar neutrality exists, the systems and methods of the present invention can provide neutrality in a forward looking predictive manner.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention.

The invention claimed is:

1. An electronic trading system for trading a list of securities, comprising:
    an algorithmic trading facility electronically coupled, via an electronic data network, (i) with at least one electronic trading destination including at least one alternative trading system (ATS), (ii) with a plurality of trading clients via the electronic data network, and (iii) with a real-time market feed via the electronic data network, said algorithmic trading facility comprising:
    means for receiving an electronic trade request to trade a list of securities from a trading client from the plurality of trading clients, said request including user defined trading constraints selected via a graphical user interface displayed on the trading client, and said list of securities including at least two different securities;
    means for receiving real-time market data from the real-time market feed via the electronic data network;
    means for generating a plurality of electronic trade orders and for submitting said electronic trade orders, via the electronic data network, to said at least one ATS based on trading data related to said destinations including said real-time market data, said trade list, and said trading constraints;
    means for monitoring, in real-time via the electronic data network, said at least one ATS to identify a set of executed trades corresponding to said plurality of trade orders;
    means for calculating a trade imbalance based on the set of identified executed trades and said trade list;
    means for determining whether said trade imbalance exceeds said trading constraints; and
    means for reallocating one or more of said submitted electronic trade orders from said at least one ATS to at least another ATS of said plurality of trade destination, until said trade imbalance does not exceed said trading constraints based on whether said trade imbalance exceeds said trading constraints.

2. The system as recited in claim 1, wherein said trading constraints include at least one of a BUY minus SELL tolerance, a SELL minus BUY tolerance, and a SELL-to-BUY ratio.

3. The system as recited in claim 1, said system further include historical trading data facilities for historical trading data from each of said ATSs, and said trading data includes said historical trading data.

4. The system as recited in claim 1, wherein said means for calculating:
    calculates a product of said SELL-to-BUY Ratio and a total value of trades from said identified executed trades to BUY securities,
    determines a total value of trades from said identified executed trades to SELL securities, and
    subtracts the product from the SELL value.

5. The system as recited in claim 1, wherein said means for calculating calculates an expected trade imbalance based on historical market data.

6. The system as recited in claim 5, wherein said means for calculating:
    calculates a product of said SELL-to-BUY Ratio and a total value of expected orders to BUY securities from historical market data;
    determines a total value of expected orders to SELL securities from historical market data; and
    subtracts the product from the total expected SELL value.

7. The system as recited in claim 6, wherein the total expected BUY value is determined by:
    means for determining a probability that an order to BUY will be present for the corresponding security, and
    means for multiplying the probability by the average trade size of said corresponding security.

8. The system as recited in claim 6, wherein the total expected SELL side value is determined by:
    means for determining a probability that an order to SELL will be present for the corresponding security, and
    means for multiplying the probability by the average trade size of said corresponding security.

9. The system as recited in claim 2, wherein the algorithmic trading facility is configured further to adjust the SELL minus BUY tolerance based upon identified trade executions.

10. The system as recited in claim 2, wherein the algorithmic trading facility is configured further to adjust the SELL minus BUY tolerance to a new SELL Minus BUY Tolerance=
    Client SELL Minus BUY Tolerance−(SELL Executions−BUY Executions*SELL-to-BUY Ratio).

11. The system as recited in claim 2, wherein the algorithmic trading facility is configured further to adjust BUY minus SELL tolerance to equal: New BUY Minus SELL Tolerance=Client BUY Minus SELL Tolerance+(SELL Executions−BUY Executions *SELL-to-BUY Ratio).

12. The system as recited in claim 1, wherein said trading data includes weighted real-time data and historical data.

13. The system as recited in claim 1, wherein said means for reallocating reallocates unexecuted trade orders from one ATS to another ATS based on the identified executed trades.

14. The system as recited in claim 1, wherein said means for reallocating:
    cancels at least one of said submitted orders,
    corrects at least one of said submitted orders, or
    uses reserved shares.

15. The system as recited in claim 1, wherein means for calculating a trade imbalance:
    identifies unexecuted trades by finding the difference of said trade list and said executed trades; and identifies a trade imbalance based on said unexecuted trades and said trade list.

\* \* \* \* \*